(12) United States Patent
Burdeniuc et al.

(10) Patent No.: US 9,447,223 B2
(45) Date of Patent: *Sep. 20, 2016

(54) ADDITIVES FOR IMPROVING NATURAL OIL BASED POLYURETHANE FOAM PERFORMANCE

(75) Inventors: Juan Jesus Burdeniuc, Colmar, PA (US); James Douglas Tobias, Center Valley, PA (US); Renee Jo Keller, Orwigsburg, PA (US); You-Moon Jeon, Breinigsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/534,171

(22) Filed: Jun. 27, 2012

(65) Prior Publication Data

US 2013/0065978 A1  Mar. 14, 2013

Related U.S. Application Data

(60) Provisional application No. 61/505,269, filed on Jul. 7, 2011.

(51) Int. Cl.
| | | |
|---|---|---|
| *C08G 18/66* | (2006.01) | |
| *C08K 5/31* | (2006.01) | |
| *C08J 9/00* | (2006.01) | |
| *C08G 18/38* | (2006.01) | |
| *C08K 5/315* | (2006.01) | |
| *C08G 101/00* | (2006.01) | |

(52) U.S. Cl.
CPC ....... *C08G 18/6696* (2013.01); *C08G 18/3838* (2013.01); *C08J 9/0028* (2013.01); *C08K 5/31* (2013.01); *C08G 2101/005* (2013.01); *C08G 2101/0008* (2013.01); *C08G 2101/0083* (2013.01); *C08J 2205/06* (2013.01); *C08J 2375/04* (2013.01); *C08K 5/3155* (2013.01)

(58) Field of Classification Search
CPC C08G 18/3838; C08G 18/6696; C08K 5/31; C08K 5/3155; C08L 75/04
USPC ................................................ 521/155, 170
See application file for complete search history.

(56) References Cited

U.S. PATENT DOCUMENTS

| | | | |
|---|---|---|---|
| 3,462,381 A | | 8/1969 | Eaton et al. |
| 3,674,721 A | * | 7/1972 | Aufdermarsh et al. ...... 521/129 |
| 3,734,868 A | | 5/1973 | Heinz Uelzmann et al. |
| 3,931,064 A | | 1/1976 | Ray et al. |
| 4,258,141 A | | 3/1981 | Jarre et al. |
| 4,315,996 A | * | 2/1982 | Baatz ................... B29C 67/207 521/54 |
| 4,380,593 A | * | 4/1983 | von Bonin et al. .......... 521/163 |
| 4,390,640 A | * | 6/1983 | Rasshofer et al. ............. 521/51 |
| 4,394,491 A | | 7/1983 | Hoffman |
| 4,774,268 A | | 9/1988 | Marx et al. |
| 5,384,385 A | * | 1/1995 | Trinks et al. ................... 528/52 |
| 5,416,130 A | * | 5/1995 | Liman et al. ................. 521/125 |
| 6,387,972 B1 | | 5/2002 | Ghobary et al. |
| 6,432,864 B1 | | 8/2002 | Wendel et al. |
| 6,525,162 B1 | * | 2/2003 | Altounian ....................... 528/81 |
| 6,750,265 B2 | * | 6/2004 | Pauls et al. ................... 521/107 |
| 6,765,035 B2 | * | 7/2004 | Eling et al. ................... 521/174 |
| 6,849,667 B2 | * | 2/2005 | Haseyama et al. ........... 521/170 |
| 8,076,385 B2 | * | 12/2011 | Ohama ......................... 521/120 |
| 2004/0082712 A1 | * | 4/2004 | Blount ........................... 524/589 |
| 2004/0242910 A1 | | 12/2004 | Dwan 'Isa et al. |
| 2005/0282921 A1 | | 12/2005 | Flanigan et al. |
| 2006/0229375 A1 | | 10/2006 | Hsiao et al. |
| 2006/0235098 A1 | * | 10/2006 | Burdeniuc et al. ............. 521/99 |
| 2007/0197672 A1 | | 8/2007 | Lekovie et al. |
| 2007/0287761 A1 | * | 12/2007 | Bender et al. ................ 521/129 |
| 2009/0270523 A1 | * | 10/2009 | Dai et al. ...................... 521/137 |
| 2010/0216905 A1 | * | 8/2010 | Kuwamura et al. .......... 521/170 |
| 2012/0071576 A1 | * | 3/2012 | Burdeniuc et al. ........... 521/128 |

FOREIGN PATENT DOCUMENTS

| | | |
|---|---|---|
| DE | 195 45 165 A1 | 6/1997 |
| EP | 0 307 987 A2 | 3/1989 |
| GB | 1 420 293 A | 1/1976 |
| JP | 52128997 | 10/1977 |
| JP | 59197416 | 11/1984 |
| JP | 01158023 | 6/1989 |
| JP | 01287166 | 11/1989 |
| WO | 01/58976 A1 | 8/2001 |
| WO | 01/70842 A2 | 9/2001 |
| WO | 03/016372 A1 | 2/2003 |
| WO | 03/016373 A1 | 2/2003 |
| WO | 03/055930 A1 | 7/2003 |
| WO | 2004/060956 A1 | 7/2004 |
| WO | 2006/116456 A1 | 11/2006 |
| WO | WO-2007127379 A1 * | 11/2007 |
| WO | WO-2009051114 A1 * | 4/2009 |

\* cited by examiner

*Primary Examiner* — Peter F Godenschwager
*Assistant Examiner* — Andrew J Oyer
(74) *Attorney, Agent, or Firm* — Michael K. Boyer

(57) ABSTRACT

Polyurethane foam compositions and processes to make flexible polyurethane foams are disclosed. Polyurethane foam is produced in the presence of additives comprising guanidine derivatives. Improvements in physical properties such as air flow, dimensional stability, tensile, tear, elongation and foam hardness is observed when these additives are present in polyurethane formulations. In addition, these additives can minimize polymer degradation under humid ageing conditions resulting in foam products with better mechanical properties.

27 Claims, No Drawings

ADDITIVES FOR IMPROVING NATURAL OIL BASED POLYURETHANE FOAM PERFORMANCE

CROSS-REFERENCE TO RELATED APPLICATIONS

This application claims the benefit of U.S. Patent Application No. 61/505,269, filed on Jul. 7, 2011. The disclosure of Application No. 61/505,269 is hereby incorporated by reference. The subject matter of the instant invention is related to U.S. patent application Ser. No. 13/178,558, filed on Jul. 8, 2011 and entitled "Additives for Improving Polyurethane Foam Performance". The disclosure of this application is hereby incorporated by reference.

BACKGROUND OF THE INVENTION

The subject matter of the instant invention relates to polyurethane foam formulations and methods for making polyurethane foams and, in particular, formulations including at least one natural oil polyol (NOP).

The development of additives that can improve physical properties of polyurethane foam is of great interests because these additives can enable the use of more environmentally friendly components necessary to make polyurethane foam without sacrificing the mechanic performance of the finished product. Polyurethane foam is produced by reaction of polyisocyanate with polyol in the presence of a catalyst, typically tertiary amine. Unfortunately, tertiary amine catalysts can be malodorous and may have high volatility due to their low molecular weight. To overcome this problem, polyurethane manufacturers have sought to achieve amine emission-free products by using non fugitive tertiary amine catalysts. The retention of a tertiary amine in polyurethane foam can be due to the low volatility of the amine or more typically the tertiary amine would become part of the polyurethane polymer if the tertiary amine contains an isocyanate reactive group. Whether the low volatility is due to the intrinsic property of the amine or because of its incorporation in the polyurethane polymer, the presence of these tertiary amines in the finished product may cause the polyurethane polymer to undergo degradation when exposed to heat and humidity.

U.S. Pat. No. 4,258,141 discloses a process for the manufacture of flexible polyurethane foam with cyanic acid derivatives. The invention relates to a process to make flame resistant flexible polyurethane foams by reacting a mixture of diphenylmethane diisocyanates and polyphenylene polymethylene polyisocyanates having a functionality greater than 2 containing 40 to 90 percent by weight diphenylmethane diisocyanate based on the total weight of said mixture; polyol, cyanic acid derivatives such as cyanamide, dicyanamide, guanidine, biguanidine, melamine, cyanuric alkyl esterhydrazides and amides as flame inhibitors, and blowing agents, as well as, possibly, chain extenders and other additives. The cyanic acid derivatives are added to the foamable polyurethane mixture in quantities of 10 to 70% by weight, preferably 20 to 50% by weight, based on the weight of the mixture of isocyanates. These high levels of cyanic acid derivative are added to the reactive mixture as suspensions and are necessary to ensure flame resistance. Thus according to this invention at least 4.6 pphp of cyanoguanidine is needed in TDI based foam and at least 5.9 pphp of cyanoguanidine is needed in MDI based foam. The poor solubility of cyanoguanidine in the reactive mixtures requires this material to be dispensed as a suspension rather than in solution.

U.S. Pat. No. 3,931,064 discloses an isocyanate based polymeric foam material having dispersed particulate low-softening point inorganic oxide glass having a transformation temperature of not greater than 300° C. and optionally a blowing agent which is capable of liberating a non-flammable gas on heating above a temperature in the range of 150 to 400° C. The invention relates to the incorporation of low softening point glass, particularly a phosphate glass, into an isocyanate-based foam and especially into a rigid isocyanate-based foam which confers a degree of fire retardance and may also give less smoke generation on combustion of the foam than the combustion of foams containing conventional fire-retardants additives.

US Pat. Application Pub No. 2007/0197672 A1 discloses foamable one part polyurethane compositions containing a high functionality quasi-prepolymer and a hydrated salt.

Polyols useful in the preparation of polyurethane foam from inexpensive and renewable resources are highly desirable to minimize the depletion of fossil fuel and other non-sustainable resources. WO01/70842 A2 describes the formation of rigid polyurethane foam for insulation uses as the reaction product of a polyol selected from a vegetable oil, a mineral oil, a glycol, syrup, or a combination thereof with a polyisocyanate in the presence of a catalyst and at least one blowing agent. US2004/0242910 A1 describes a method to make natural oil polyol made by reaction of natural oil from vegetal or animal source with a multifunctional hydroxyl compound derived from a natural source such as sorbitol in the presence of an alkali metal salt or base such as potassium hydroxide as catalyst. US2005/0282921 A1 provides a cellular material obtained by the reaction of soy-based polyol, petro-based blowing agent, cross-linking agent, a combination of silicone surfactants and isocyanate. US2006/0229375 A1 relates to polyurethane foam made with alkoxylated vegetable oil hydroxylates replacing at least a portion of the typically used petroleum based polyols.

The previously identified patents and patent applications are hereby incorporated by reference.

BRIEF SUMMARY OF THE INVENTION

The instant invention solves problems associated with conventional foam formulations and methods by providing guanidine derivative containing additive composition and a method for using the composition to produce NOP based polyurethane foam. The instant invention comprises making polyurethane foam in the presence of guanidine derivatives which are added to the formulation as dissolved in a suitable solvent. Examples of such compounds comprise at least one of guanidine, cyano guanidine, guanidine hydrochloride salt, guanidine phosphate salts, guanidine sulfate salts, 1-acetyl-guanidine, nitroguanidine, and 1-(o-tolyl)biguanidine. Suitable solvents for the guanidine derivatives comprise at least one of ethylene glycol, diethylene glycol, polyethylene glycol (such as PEG-200), propylene glycol, dipropylene glycol, polypropylene glycol, dimethyl sulfoxide (DMSO), sulfolane, N,N-dimethylacetoacetamide, N-monomethyl acetoacetamide, and N-methylpyrrolidone. In particular, the instant invention relates to the use of guanidine derivatives in the presence of natural oil polyols (NOP) which are a desirable source for the production of polyurethane foam. Examples of suitable solvents comprise at least one member selected from the group consisting of ethylene glycol, diethylene glycol, polyethylene glycol (such as PEG-200), propylene glycol, dipropylene glycol, polypropylene glycol, dimethyl sulfoxide (DMSO), sulfolane, N,N-dimethylacetoacetamide, N-monomethyl acetoacetamide, and N-methylpyrrolidone.

These inventive additives can allow higher use levels of NOP in polyurethane formulation without compromising the physical properties of the finished polyurethane products.

Soluble guanidine derivatives can enable the incorporation of more sustainable raw materials such as natural oil polyols. If NOPs are introduced in formulations to replace conventional polyether polyol physical properties such as tensile, tear and elongation can deteriorate yielding finished product with poorer mechanical properties and lower ageing stability. However, this limitation can be overcome when NOPs are used in combination with soluble guanidine additives described by the instant invention.

In one aspect of the invention, these additives can improve the dimensional stability of the finished polyurethane product. For example, when flexible foams are produced in a heated mold it is necessary to crush the foam parts after being pulled out of the mold because they can lose their dimensional stability and shrink. Shrinkage is produced because flexible molded foam contains a relatively high percentage of closed cells and when the gas entrapped cools down the foam collapses due to the internal pressure loss. The process of the invention employs guanidine derivatives that can act as cell openers minimizing the loss of dimensional stability (shrinkage). The inventive composition and process provide the advantage that in the case of flexible foam produced in a heated mold no foam crushing may be required and in the case of free rise foams less foam shrinkage would occur. This results in scrap minimization and provides products with high quality (high dimensional stability). Also, the use of these additives would produce foam with superior physical properties both at ambient and after humid heat ageing.

In one aspect of the invention, the inventive additives improve physical properties at ambient conditions and also improve the stability of the polyurethane polymer when aged in the presence of hot humidity. In particular, ambient physical properties can become similar or very similar to fugitive catalysts when using a non-emissive catalyst/additive combination. Also, these additives can allow the usage of more environmentally friendly amine products that normally cannot match the performance of standard amine catalysts when used without the guanidine-derivative additives.

In another aspect of the invention, the additives (e.g., cyanoguanidine), are dissolved in order to produce the desired improvement in physical properties of polyurethane foam. In addition, the amount of guanidine derivative (e.g., cyanoguanidine), is used in an amount less than about 2.0 pphp in the foam pre-mix or foam precursor (e.g., less than about 2.0 pphp and typically less than about 2.5 PPHP).

In another aspect of the invention, the additives (e.g., guanidine derivatives) are used in a foam pre-mix or foam precursor wherein the amount of DICY that is less than about 1.0 PPHP DICY (e.g., in order to minimize foam collapse due to excessive cell opening).

In a further aspect, the invention relates to a foam precursor comprising: at least one natural oil polyol, at least one polyisocyante, at least one blowing agent, at least one catalyst and at least one guanidine derivative.

Another aspect of the invention relates to a method for making foam comprising reacting the inventive precursor under conditions sufficient to produce a stable foam, and to a foam obtained from the method.

DETAILED DESCRIPTION OF THE INVENTION

Preparation of Foams

Foams of any of the various types known in the art may be made using the methods of this invention, using typical polyurethane formulations to which have been added at least one guanidine derivative and the amine catalysts. The amount of guanidine derivative can vary but will typically range from about 0.01 pphp to about 2.0 pphp. For example, flexible polyurethane foams with excellent physical properties described herein will typically comprise the components shown below in Table 1, in the amounts indicated. The components shown in Table 1 will be discussed in detail below.

TABLE 1

| Polyurethane Components | |
|---|---|
| Component | Parts by Weight |
| Base Polyol | 20-100 |
| Polymer polyol | 0-80 |
| Silicone surfactant | 0.5-10 |
| Blowing agent | 2-4.5 |
| Crosslinker | 0.5-2 |
| Catalyst | 0.25-10 |
| Polyisocyanate | To provide NCO index = 70-115 |

The amount of polyisocyanate used in polyurethane formulations according to the invention is not limited, but it will typically be within those ranges known to those of skill in the art. An exemplary range is given in table 1, indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula.

$$\text{NCO index}=[\text{NCO}/(\text{OH}+\text{NH})]*100$$

The NCO index will typically range from about 70 to about 120 and normally about 80 to about 110.

Flexible foams typically use copolymer polyols as part of the overall polyol content in the foam composition, along with base polyols of about 4000-5000 weight average molecular weight and hydroxyl number of about 28-35. Base polyols and copolymer polyols will be described in detail later herein.

Catalysts

The catalysts of the present invention comprise tertiary amines. Tertiary amine catalysts can contain an isocyanate-reactive group or not. Isocyanate reactive groups comprise primary amine, secondary amine, hydroxyl group, amide or urea. Tertiary amine catalysts containing isocyanate reactive groups include both gelling and blowing catalysts. Exemplary gelling catalysts include N,N-bis(3-dimethylaminopropyl)-N-isopropanolamine; N,N-dimethylaminoethyl-N'-methyl ethanolamine (DABCO® T, Air Products and Chemicals, Inc. of Allentown, Pa.); N,N,N'-trimethylaminopropyl ethanolamine (POLYCAT® 17, by Air Products and Chemicals, Inc.), N,N-dimethylethanolamine (DABCO® DMEA); N,N-dimethyl-N',N'-2-hydroxy(propyl)-1,3-propylenediamine; dimethylaminopropylamine (DMAPA); (N,N-dimethylaminoethoxy)ethanol, methyl-hydroxy-ethyl-piperazine, bis(N,N-dimethyl-3-aminopropyl)amine (POLYCAT® 15), N,N-dimethylaminopropyl urea (DABCO® NE1060, DABCO® NE1070), N,N'-bis(3-dimethylaminopropyl) urea (DABCO® NE1070, DABCO®

NE1080), bis(dimethylamino)-2-propanol, 6-dimethylamino-1-hexanol, N-(3-aminopropyl)imidazole, N-(2-hydroxypropyl)imidazole, and N-(2-hydroxyethyl) imidazole. The amount of tertiary amine catalyst typically range from about 0.02 pphp to about 20 pphp and normally about 0.05 pphp to about 10 pphp Exemplary blowing catalysts containing isocyanate reactive groups include 2-[N-(dimethylaminoethoxyethyl)-N-methylamino]ethanol (DABCO® NE200), dimethylaminoethoxyethanol and N,N,N'-trimethyl-N'-3-aminopropyl-bis (aminoethyl) ether (DABCO® NE300). The amount of blowing catalyst typically ranges from about 0.01 pphp to about 10 pphp and typically about 0.05 pphp to about 5 pphp The catalyst may also comprise tertiary amines that are highly volatile and not isocyanate-reactive. Suitable volatile gelling catalysts may include, for example, diazabicyclooctane (triethylenediamine), supplied commercially as DABCO 33-LW) catalyst, tris(dimethyalminopropyl) amine (Polycat® 9), dimethylaminocyclohexylamine (Polycat® 8), 1,2-dimethylimidazole, 1-methylimidazole and bis(dimethylaminopropyl)-N-methylamine (Polycat® 77). Suitable volatile blowing catalysts include, for example, bis-dimethylaminoethyl ether, commercially supplied as DABCO® BL-11 catalyst by Air Products and Chemicals, Inc.; as well as pentamethyldiethylenetriamine (POLYCAT® 5, Air Products and Chemicals, Inc.), hexamethyltriethylenetetramine, heptamethyltetraethylenepentamine and related compositions; higher permethylated polyamines; 2[N-(dimethylaminoethoxyethyl)-N-methylamino]ethanol and related structures; alkoxylated polyamines; imidazole-boron compositions; or amino propyl-bis(amino-ethyl)ether compositions. The catalyst compositions may also include other components, for example transition metal catalysts such as organotin compounds, salts of tin, organobismuth and bismuth salts, for example when the desired polyurethane foam is a flexible slab stock. Examples of suitable metal catalysts can comprise at least one member selected from the group consisting of dibutylin dilaureate, dimethyltin dilaureate, dimethyltin diacetate, dibutyltin diacetate, dimethyltin dilaurylmercaptide, dibutyltin dilaurylmercaptide, dimethyltin diisooctylmaleate, dibutyltin diisooctylmaleate, dimethyltin bi(2-thylhexyl mercaptacetate), dibutyltin bi(2-thylhexyl mercaptacetate), stannous octate, other suitable organotin catalysts, or a combination thereof. Other metals can also be included, such as, for example, bismuth (Bi). Suitable bismuth carboxylate salts includes salts of pentanoic acid, neopentanoic acid, hexanoic acid, 2-ethylhexyl carboxylic acid, neohexanoic acid, octanoic acid, neooctanoic acid, heptanoic acid, neoheptanoic acid, nonanoic acid, neononanoic acid, decanoic acid, neodecanoic acid, undecanoic acid, neoundecanoic acid, dodecanoic acid, neododecanoic acid, and other suitable carboxylic acids. Other salts of transition metals of lead (Pb), iron (Fe), zinc (Zn) with pentanoic acid, neopentanoic acid, hexanoic acid, 2-ethylhexyl carboxylic acid, octanoic acid, neooctanoic acid, neoheptanoic acid, neodecanoic acid, neoundecanoic acid, neododecanoic acid, and other suitable carboxylic acids may also be included. The amount of the foregoing catalyst typically ranges from about 0.005 pphp to about 20 pphp and normally about 0.01 pphp to about 10 pphp Typically, the loading of non-fugitive tertiary amine catalyst(s) for making foam according to the invention will be in the range of 0.1 to 20 pphp, more typically 0.1 to 10 pphp, and most typically 0.1 to 5 pphp. However, any effective amount may be used. The term "pphp" means parts per hundred parts polyol.

Organic Isocyanates

Suitable organic isocyanate compounds include, but are not limited to, hexamethylene diisocyanate (HDI), phenylene diisocyanate (PDI), toluene diisocyanate (TDI), and 4,4'-diphenylmethane diisocyanate (MDI). In one aspect of the invention, 2,4-TDI, 2,6-TDI, or any mixture thereof is used to produce polyurethane foams. Other suitable isocyanate compounds are diisocyanate mixtures known commercially as "crude MDI." One example is marketed by Dow Chemical Company under the name PAPI, and contains about 60% of 4,4'-diphenylmethane diisocyanate along with other isomeric and analogous higher polyisocyanates. While any suitable isocyanate can be used, an example of such comprises isocyanate having an index range from about 80 to about 120 and typically from about 90 to about 110.

Polyol Component

Polyurethanes are produced by the reaction of organic isocyanates with the hydroxyl groups in a polyol, typically a mixture of polyols. The polyol component of the reaction mixture includes at least a main or "base" polyol. Base polyols suitable for use in the invention include, as non-limiting examples, polyether polyols. Polyether polyols include poly(alkylene oxide)polymers such as poly(ethylene oxide) and poly(propylene oxide)polymers and copolymers with terminal hydroxyl groups derived from polyhydric compounds, including diols and triols. Examples of diols and triols for reaction with the ethylene oxide or propylene oxide include ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, and similar low molecular weight polyols. Other base polyol examples known in the art include polyhydroxy-terminated acetal resins, hydroxyl-terminated amines and hydroxyl-terminated polyamines. Examples of these and other suitable isocyanate-reactive materials may be found in U.S. Pat. No. 4,394,491; hereby incorporated by reference. Suitable polyols also include those containing tertiary amine groups than can catalyze the gelling and the blowing reaction of polyurethanes, for example those described in WO 03/016373 A1, WO 01/58976 A1; WO2004/060956 A1; WO03/016372 A1; and WO03/055930 A; the foregoing incorporated by reference. Other useful polyols may include polyalkylene carbonate-based polyols and polyphosphate-based polyols.

In one aspect of the invention, a single high molecular weight polyether polyol may be used as the base polyol. Alternatively, a mixture of high molecular weight polyether polyols, for example, mixtures of di- and tri-functional materials and/or different molecular weight or different chemical composition materials may be used. Such di- and tri-functional materials include, but are not limited to polyethylene glycol, polypropylene glycol, glycerol-based polyether triols, trimethylolpropane-based polyether triols, and other similar compounds or mixtures. In some embodiments of the invention, at least 50 wt % polyol component consists of one or more polyether polyols.

In addition to the base polyols described above, or instead of them, materials commonly referred to as "copolymer polyols" may be included in a polyol component for use according to the invention. Copolymer polyols may be used in polyurethane foams to increase the resistance of the foam to deformation, for example to improve the load-bearing properties of the foam. Depending upon the load-bearing requirements for the polyurethane foam, copolymer polyols may comprise from 0 to about 80 percent by weight of the total polyol content. Examples of copolymer polyols include, but are not limited to, graft polyols and polyurea modified polyols, both of which are known in the art and are commercially available.

Graft polyols are prepared by copolymerizing vinyl monomers, typically styrene and acrylonitrile, in a starting polyol. The starting polyol is typically a glycerol-initiated triol, and is typically end-capped with ethylene oxide (approximately 80-85% primary hydroxyl groups). Some of the copolymer grafts to some of the starting polyol. The graft polyol also contains homopolymers of styrene and acrylonitrile and unaltered starting polyol. The styrene/acrylonitrile solids content of the graft polyol typically ranges from 5 wt % to 45 wt %, but any kind of graft polyol known in the art may be used.

Polyurea modified polyols are formed by the reaction of a diamine and a diisocyanate in the presence of a starting polyol, with the product containing polyurea dispersion. A variant of polyurea modified polyols, also suitable for use, are polyisocyanate poly addition (PIPA) polyols, which are formed by the in situ reaction of an isocyanate and an alkanolamine in a polyol.

Natural Oil Polyol Component

Polyols useful in the preparation of polyurethane foam from inexpensive and renewable resources are highly desirable to minimize the depletion of fossil fuel and other non-sustainable resources. Natural oils comprise triglycerides of saturated and unsaturated fatty acids. One natural oil polyol is castor oil, a natural triglyceride of ricinoleic acid which is commonly used to make polyurethane foam even though it has certain limitations such as low hydroxyl content. Other natural oils can be chemically modified to introduce sufficient hydroxyl content to make them useful in the production of polyurethane polymers. There are two chemically reactive sites that can be considered when attempting to modify natural oil or fat into a useful polyol: 1) the unsaturated sites (double bonds); and 2) the ester functionality. Unsaturated sites present in oil or fat can be hydroxylated via epoxidation/ring opening or hydroformilation/hydrogenation. Alternatively, trans-esterification can also be utilized to introduce OH groups in natural oil and fat. The chemical process for the preparation of natural polyols using epoxidation route involves a reaction mixture that requires epoxidized natural oil, a ring opening acid catalyst and a ring opener. Epoxidized natural oils include epoxidized plant-based oils (epoxidized vegetable oils) and epoxidized animal fats. The epoxidized natural oils may be fully or partially epoxidized and these oils include soybean oil, corn oil, sunflower oil, olive oil, canola oil, sesame oil, palm oil, rapeseed oil, tung oil, cotton seed oil, safflower oil, peanut oil, linseed oil and combinations thereof. Animal fats include fish, tallow and lard. These natural oils are triglycerides of fatty acids which may be saturated or unsaturated with various chain lengths from C12 to C24. These acids can be: 1) saturated: lauric, myristic, palmitic, steric, arachidic and lignoceric; 2) mono-unsaturated: palmitoleic, oleic, 3) poly-unsaturated: linoleic, linolenic, arachidonic. Partially or fully epoxidized natural oil may be prepared when reacting peroxyacid under suitable reaction conditions. Examples of peroxyacids utilized in the epoxidation of oils have been described in WO 2006/116456 A1; the disclosure of which is hereby incorporated by reference. Ring opening of the epoxidized oils with alcohols, water and other compounds having one or multiple nucleophilic groups can be used. Depending on the reaction conditions oligomerization of the epoxidized oil can also occur. Ring opening yields natural oil polyol that can be used for the manufacture of polyurethane products. In the hydroformilation/hydrogenation process, the oil is hydroformylated in a reactor filled with a hydrogen/carbon monoxide mixture in the presence of a suitable catalyst (typically cobalt or rhodium) to form an aldehyde which is hydrogenated in the presence of cobalt or nickel catalyst to form a polyol. Alternatively, polyol form natural oil and fats can be produced by trans-esterification with a suitable poly-hydroxyl containing substance using an alkali metal or alkali earth metal base or salt as a trans-esterification catalyst. Any natural oil or alternatively any partially hydrogenated oil can be used in the transesterification process. Examples of oils include but are not limited to soybean, corn, cottonseed, peanut, castor, sunflower, canola, rapeseed, safflower, fish, seal, palm, tung, olive oil or any blend. Any multifunctional hydroxyl compound can also be used such as lactose, maltose, raffinose, sucrose, sorbitol, xylitol, erythritol, mannitol, or any combination.

If desired, the NOPs can be used alone or in combination with the other previously described polyols. The amount of polyol including the NOP ranges from about 1 pphp to about 50 pphp and typically from about 5 to about 30 pphp and more typically about 10 to about 20 pphp.

Blowing Agents

Suitable blowing agents (BA) include compounds with low boiling points which are vaporized during the exothermic polymerization reaction. Such blowing agents are generally inert or they have low reactivity and therefore it is likely that they will not decompose or react during the polymerization reaction. Examples of blowing agents include, but are not limited to, carbon dioxide, chlorofluorocarbons (CFCs), hydrofluorocarbons (HFCs), hydrochlorofluorocarbons (HCFCs), fluoroolefins (FOs), chlorofluoroolefins (CFOs), hydrofluoroolefins (HFOs), hydrochlorfluoroolefins (HCFOs), acetone, and low-boiling hydrocarbons such as cyclopentane, isopentane, n-pentane, and their mixtures. Other suitable blowing agents include compounds, for example water, that react with isocyanate compounds to produce a gas. The amount of BA is typically from about 0 (water blown) to about 80 pphp. Water (blow foam by reacting with isocyanate making $CO_2$) can be present in the range from about 0 (if a BA is included) to about 60 pphp (a very low density foam) and typically from about 1.0 pphp to about 10 pphp and, in some cases, from about 2.0 pphp to about 5 pphp.

Other Optional Components

A variety of other ingredients may be included in the formulations for making foams according to the invention. Examples of optional components include, but are not limited to, acids, cell stabilizers, crosslinking agents, chain extenders, pigments, fillers, flame retardants, auxiliary urethane gelling catalysts, auxiliary urethane blowing catalysts, transition metal catalysts, and combinations of any of these.

Acids added to the formulations can comprise carboxylic acids. Carboxylic acids are normally added to the polyurethane formulation to slow down the activity of the tertiary amine and prevent a fast increase in viscosity which allows for a more efficient mold-filling operation particularly in cases where molds with complex shapes and geometries are needed. This approach allows filling of small cavities and voids minimizing the number of defective articles. Acids most commonly used for this purpose are monoacids such as acetic acid, propionic acid, butanoic acid, hexanoic acid, 2-ethylhexanoic acid and the like. Other acids can also be used such as those described U.S. Pat. No. 6,387,972 and U.S. Pat. No. 6,432,864; hereby incorporated by reference.

Cell stabilizers may include, for example, silicone surfactants or anionic surfactants. Examples of suitable silicone surfactants include, but are not limited to, polyalkylsiloxanes, polyoxyalkylene polyol-modified dimethylpolysiloxanes, alkylene glycol-modified dimethylpolysiloxanes, or any combination thereof. Suitable anionic surfactants include, but are not limited to, salts of fatty acids, salts of sulfuric acid esters, salts of phosphoric acid esters, salts of sulfonic acids, and combinations of any of these.

Crosslinking agents include, but are not limited to, low-molecular weight compounds containing at least two moieties selected from hydroxyl groups, primary amino groups, secondary amino groups, and other active hydrogen-containing groups which are reactive with an isocyanate group. Crosslinking agents include, for example, polyhydric alcohols (especially trihydric alcohols, such as glycerol and trimethylolpropane), polyamines, and combinations thereof. Non-limiting examples of polyamine crosslinking agents include diethyltoluenediamine, chlorodiaminobenzene, diethanolamine, diisopropanolamine, triethanolamine, tripropanolamine, 1,6-hexanediamine, and combinations thereof. Typical diamine crosslinking agents comprise twelve carbon atoms or fewer, more commonly seven or fewer.

Examples of chain extenders include, but are not limited to, compounds having hydroxyl or amino functional group, such as glycols, amines, diols, and water. Specific non-limiting examples of chain extenders include ethylene glycol, diethylene glycol, propylene glycol, dipropylene glycol, 1,4-butanediol, 1,3-butanediol, 1,5-pentanediol, neopentyl glycol, 1,6-hexanediol, 1,10-decanediol, 1,12-dodecanediol, ethoxylated hydroquinone, 1,4-cyclohexanediol, N-methylethanolamine, N-methylisopropanolamine, 4-aminocyclohexanol, 1,2-diaminoethane, 2,4-toluenediamine, or any mixture thereof. Pigments may be used to color code the polyurethane foams during manufacture, for example to identify product grade or to conceal yellowing. Pigments may include any suitable organic or inorganic pigments known in the polyurethane art. For example, organic pigments or colorants include, but are not limited to, azo/diazo dyes, phthalocyanines, dioxazines, and carbon black. Examples of inorganic pigments include, but are not limited to, titanium dioxide, iron oxides, or chromium oxide.

Fillers may be used to increase the density and load bearing properties of polyurethane foams. Suitable fillers include, but are not limited to, barium sulfate or calcium carbonate.

Flame retardants may be used to reduce the flammability of polyurethane foams. For example, suitable flame retardants include, but are not limited to, chlorinated phosphate esters, chlorinated paraffins, or melamine powders. Cell stabilizers can used in an amount from about 0.1 to about 20 pphp and typically from about 0.1 to about 10 pphp and, in some cases, from about 0.1 to about 5.0 pphp. Fire retardants can be used in an amount from about 0 to about 20 pphp and from about 0 to about 10 pphp and from about 0 to about 5 pphp. The amount of the other components typically comprises about 0 pphp to about 40 pphp and normally about 5 pphp to about 20 pphp The following Examples are provided to illustrate certain aspects of the instant invention and shall not be used to limit the scope of the claims attached hereto.

EXAMPLES 1 and 2

Examples 1 and 2 demonstrate making polyurethane foams by utilizing guanidine derivatives in the presence of tertiary amine catalysts (fugitive or non-fugitive) or acid blocked tertiary amine catalysts. The acid blocked tertiary amine catalysts are made by combining tertiary amine catalysts with suitable organic acids. Listed are the TDI and MDI based polyurethane foam formulations which were used to evaluate the additives using conventional acid blocked or non-blocked tertiary amine catalysts in free-rise and molded foams. In the case of flexible molded foams, the pads were removed from the heated mold and allowed to cool down to room temperature to monitor dimensional stability (shrinkage) or mechanically crushed to evaluate their physical and mechanical properties.

EXAMPLE 1

Handmix experiments were conducted using the following procedure. Formulations were blended together for approximately 10 minutes using a mechanical mixer equipped with a 7.6 cm diameter high shear mixing blade, rotating at 5000 rpm. Premixed formulations were maintained at 23±1° C. using a low temperature incubator. Mondur TD-80 (an 80/20 2.4/2.6 isomer blend of toluene diisocyanate) or modified MDI was added to the premix at the correct stoichiometric amount for the reported index of each foam. The mixture was blended together with Premier Mill Corporation Series 2000, Model 89, and dispersed for approximately five seconds. The foaming mixture was transferred to an Imperial Bondware #GDR-170 paper bucket and allowed to free rise while data was recorded.

EXAMPLE 2

Machine runs for the flexible molded foam were conducted on a Hi Tech Sure Shot MHR-50, cylinder displacement series and high-pressure machine. Fresh premixes, consisting of the appropriate polyols, water, crosslinker, surfactants and catalysts for each formulation were charged to the machine. Mondur TD-80 was used throughout the entire study. All chemical temperatures were held at 23±2° C. via the machine's internal temperature control units. Foam pours were made into an isothermally controlled, heated aluminum mold maintained at 63±2° C. The mold was a typical physical property tool designed with internal dimensions of 40.6 cm×40.6 cm×10.2 cm. The mold has five vents, each approximately 1.5 mm in diameter, centered in each corner 10.0 cm from each edge and the geometric center of the lid. The mold was sprayed with a solvent-based release agent, prior to every pour and allowed to dry for one minute before pouring. The foam premix was puddle poured into the center of the mold with a wet chemical charge weight capable of completely filling the mold and obtaining the desired core densities reported. Minimum fill requirements were established for each formulation evaluated. The foam article was demolded at 240 seconds (4 minutes) after the initial pour (detailed in next paragraph). Upon demold, the foam was placed through a mechanical crusher or tested for Force-to-Crush (FTC) measurements or allow to cool down to determine dimensional stability (detailed below).

Foam physical properties of each catalyst set were mechanically crushed 1 minute after demold using a Black Brothers Roller crusher set to a gap of 2.54 cm. Crushing was conducted three times on each part, rotating the foam 90 degrees after each pass through the rollers. All parts produced for physical testing were allowed to condition for at least seven days in a constant temperature and humidity room (23±2° C., 50±2% relative humidity).

FTC measurements were conducted 45 seconds after demold. The pad was removed from the mold, weighed and placed in the FTC apparatus. The force detection device is equipped with a 2.2 kg capacity pressure transducer mounted between the 323 cm² circular plate cross head and the drive shaft. The actual force is shown on a digital display. This device mimics the ASTM D-3574, Indentation Force Deflection Test and provides a numerical value of freshly demolded foam's initial hardness or softness. The pad was compressed to 50 percent of its original thickness at a cross-head velocity of 275 mm per minute with the force necessary to achieve the highest compression cycle recorded in Newton's. Ten compression cycles were completed. A cycle takes approximately 30 seconds to complete.

EXAMPLE 3

Physical Properties of Flexible Polyurethane Foam Made with Fugitive Catalysts in the Presence and in the Absence of Cyanoguanidine Foam pads were prepared by adding a tertiary amine catalyst to about 302 g of a premix (prepared as in Table 2) in a 32 oz (951 ml) paper cup. The formulation was mixed for about 10 seconds at about 6,000 RPM using an overhead stirrer fitted with a 2-inch (5.1 cm) diameter stirring paddle.

The toluene diisocyanate was then added, and the formulation was mixed well for about another 6 seconds at about 6,000 RPM using the same stirrer, after which it was poured into a pre-heated mold at 70° C. and demolded after 4 minutes. The foam pads were removed from the mold, hand crushed, weighed and machine crushed at 75% pad thickness. Dimensional stability (foam shrinkage) was evaluated by allowing the foam pads to cool down and observing whether shrinkage or not took place. Foam pads were stored under constant temperature and humidity conditions for 48 hours before being cut and tested.

TABLE 2

| Premix Components | |
|---|---|
| Component | Parts by weight |
| Hyperlite E848[1] | 100 |
| Water | 3.7 |
| DABCO ® DC5164[2] | 0.10 |
| DABCO ® DC5169[3] | 0.60 |
| DABCO ®33LX[4] | 0.30 |
| DABCO ®BL11[5] | 0.10 |

TABLE 2-continued

| Premix Components | |
|---|---|
| Component | Parts by weight |
| Diethanolamine-LF (crosslinker) | 1.04 |
| Toluene diisocyanate | To provide NCO index = 100 |

[1]High functionality capped polyether polyol of high molecular weight, functionality, and primary hydroxyl content with a base polyol molecular weight of about 5500, available from Dow Chemical Company, Midland, MI
[2,3]Silicone surfactant available from Air Products and Chemicals, Inc.
[4,5]Amine catalyst available from Air Products and Chemicals, Inc.

Table 3 shows the improvement in physical properties when cyanoguanidine is dispensed in the polyurethane formulation as a 30% solution in DMSO. The addition of 2-cyanoguamine provides foam products with better physical properties than the current industrial standard.

TABLE 3

| Dimensional Stability Results | | | | |
|---|---|---|---|---|
| Component/Property | Units | Control | 1 | 2 |
| Dabco ® 33LV | PPHP | 0.30 | 0.30 | 0.30 |
| Dabco ® BL11 | PPHP | 0.10 | 0.10 | 0.10 |
| DICY | PPHP | 0 | 0.03 | 0.09 |
| TDI Index | % | 100 | 100 | 100 |
| Density | Kg/m3 | 29.68 | 29.05 | 28.58 |
| Air Flow | SCFH | 2.44 | 3.33 | 4.83 |
| ILD 25% | N | 92 | 105 | 114 |
| ILD 65% | N | 236 | 266 | 273 |
| ILD 25% Return | N | 79 | 89 | 95 |
| Tear | N/m | 212 | 237 | 308 |

EXAMPLE 4

Physical Properties of Flexible Polyurethane Foam Made with Non-Fugitive Catalysts in the Presence and in the Absence of Cyanoguanidine Table 4 shows the effect of dicyanamide (10% solution in N-monomethyl acetoacetamide) when used in combination with a non-emissive catalyst in a typical MDI formulation with a density in the range 47-50 Kg/m³. The addition of dicyanamide can help improving air flows which improves foam dimensional stability. In addition other physical properties, such as ILD, tear strength and tensile strength, are also improved. Thus, better physical properties are obtained when using a combination of a non-emissive catalyst and dicyanamide when compared to emissive industry standards.

TABLE 4

| Physical Properties | | | | | | | |
|---|---|---|---|---|---|---|---|
| Component/Property | Units | Fugitive Control | Non-Fugitive Control | 3 | 4 | 5 | 6 |
| Dabco ® 33LV | PPHP | 0.40 | — | — | — | — | — |
| Dabco ® BL11 | PPHP | 0.20 | — | — | — | — | — |
| POLYCAT ®-15 | PPHP | — | 0.85 | 0.85 | 0.85 | 0.85 | 0.85 |
| DABCO ®NE300 | PPHP | — | 0.20 | 0.20 | 0.20 | 0.20 | 0.20 |
| DICY | PPHP | — | — | 0.03 | 0.05 | 0.07 | 0.09 |
| MDI Index | % | 95 | 95 | 95 | 95 | 95 | 95 |
| Density | Kg/m3 | 48 | 48 | 48 | 47 | 49 | 49 |
| Air Flow | SCFH | 1.81 | 1.09 | 1.17 | 1.17 | 2.01 | 1.70 |
| ILD 25% | N | 296 | 285 | 303 | 324 | 327 | 353 |
| ILD 65% | N | 739 | 735 | 774 | 824 | 835 | 898 |
| ILD 25% Return | N | 222 | 215 | 228 | 242 | 241 | 261 |
| Tear | N/m | 273 | 265 | 275 | 274 | 303 | 304 |
| Tensile | kPa | 133 | 151 | 153 | 151 | 168 | 177 |

EXAMPLE 5

Physical Properties of Flexible Polyurethane Foam Made with Non-Fugitive Catalysts in the Presence and in the Absence of Guanidine Hydrochloride Salt Table 5 shows the effect of guanidine hydrochloride salt when used in combination with emissive and non-emissive catalysts. The addition of a solution of guanidine hydrochloride (5% solution in polyethylene glycol-200 or PEG-200) can help improving air flows which improves foam dimensional stability. In addition other physical properties, such as tear strength, tensile strength and elongation are also improved. Humid aged physical properties such as humid aged compression set (HACS), humid aged tensile and elongation and humid aged load loss (HALL) can also improved. Thus, better physical properties are obtained when using catalysts (emissive or non-emissive) and guanidine hydrochloride when compared to the standard.

TABLE 5

| Physical Properties | | | |
| --- | --- | --- | --- |
| Component/Property | Units | Control | #7 |
| Polycat ®-15 | PPHP | 0.49 | 0.49 |
| Dabco ® BL11 | PPHP | 0.10 | 0.10 |
| Guanidine HCl | PPHP | — | 0.10 |
| TDI Index | % | 95 | 95 |
| Density | Kg/m3 | 34 | 37 |
| Air Flow | SCFH | 2.7 | 4.8 |
| Tear | N/m | 261 | 354 |
| Tensile | kPa | 98 | 114 |
| Elongation | % | 84 | 102 |
| HACS | % | 10 | 8 |
| HALL | % | −21 | −7 |

EXAMPLE 6

Physical Properties of NOP Containing Flexible Polyurethane Foam Made with Non-Fugitive Catalysts in the Presence and in the Absence of Cyanoguanidine Solutions Several formulations containing natural oil polyol were tested to evaluate the benefits of soluble guanidine compounds in polyurethane foam. NOP was used at 5.0 and 10.0 pphp using standard amine gelling and blowing catalysts. Table 5, 8 is a control formulation having conventional polyols, 9 has 5.0 pphp NOP replacing standard polyether polyol, 10 has 5.0 pphp NOP as well as 0.09 cyanoguanidine (dispensed as a 10% solution in N-monomethyl-acetoacetamide), 11 has 10 pphp NOP replacing standard polyether polyol and 12 has 10 pphp NOP in the presence of 0.09 pphp cyanoguanidine (also dispensed as 10% solution in N-monomethyl-acetoacetamide).

TABLE 6

| Formulations with NOP | | | | | |
| --- | --- | --- | --- | --- | --- |
| Component | 8 | 9 | 10 | 11 | 12 |
| Polyether polyol | 55 | 50 | 50 | 45 | 45 |
| Polymer polyol | 45 | 45 | 45 | 45 | 45 |
| Natural oil polyol (NOP) | — | 5 | 5 | 10 | 10 |
| Surfactant | 0.80 | 0.80 | 0.80 | 0.80 | 0.80 |
| DEOA (85% in water) | 0.82 | 0.82 | 0.82 | 0.82 | 0.82 |
| Water | 2.90 | 2.90 | 2.90 | 2.90 | 2.90 |
| Gelling amine catalyst | 0.55 | 0.55 | 0.55 | 0.55 | 0.55 |
| Blowing amine catalyst | 0.17 | 0.17 | 0.17 | 0.17 | 0.17 |
| Cyanoguanidine | — | — | 0.09 | — | 0.09 |
| TDI index | 100 | 100 | 100 | 100 | 100 |

Table 7 shows the physical properties for NOP containing polyurethane foam, their corresponding controls as well as cyanoguanidine additive. Samples 8 and 11 showed that replacing 5 pphp of conventional polyether polyol with NOP results in less open foam (reduction in airflow) and significantly lower tensile strength (about 20 to 30% reduction). Adding a 0.09 of cyanoguanidine (10% solution in N-monomethyl-acetoacetamide) produced open cell foam (higher airflows) with improved hardness (higher ILDs) as well as improved tensile, tear and elongation. Thus, using NOP together with a solution of a guanidine compound (cyanoguanidine in this particular case) results in foam with improved physical properties allowing the incorporation of NOP without sacrificing mechanical properties and performance.

TABLE 7

| Physical Properties | | | | | |
| --- | --- | --- | --- | --- | --- |
| Property | 8 | 9 | 10 | 11 | 12 |
| Air Flow | 3.07 | 2.63 | 3.79 | 2.94 | 3.67 |
| ILD (25%) | 164 | 169 | 236 | 175 | 202 |
| ILD (65%) | 398 | 425 | 512 | 397 | 441 |
| ILD (R) | 135 | 135 | 178 | 135 | 159 |
| Support Factor | 2.41 | 2.51 | 2.17 | 2.27 | 2.19 |
| Tensile Strength | 129 | 90 | 153 | 115 | 136 |
| Tear | 253 | 269 | 363 | 272 | 335 |
| 50% CS | 9.20 | 8.84 | 7.90 | 8.29 | 8.35 |
| Elongation | 87 | 67 | 98 | 90 | 90 |

While the invention has been described with reference to certain aspects or embodiments, it will be understood by those skilled in the art that various changes may be made and equivalents may be substituted for elements thereof without departing from the scope of the invention. In addition, many modifications may be made to adapt the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for making foam comprising contacting at least one isocyanate with a foam precursor comprising: at least one polyether polyol, at least one natural oil polyol, at least one blowing agent, at least one tertiary amine catalyst, and the presence of dicyanamide and in an amount less about 1.0 pphp, and at least one member selected from the group consisting of N,N-dimethylacetoacetamide, and N-monomethyl acetoacetamide; to form a foamable composition and foaming the foamable composition in a mold to prepare a foam.

2. A foam produced by the method of claim 1.

3. The foam of claim 2 wherein the foam has a density of 47-50Kg/m$^3$.

4. A method for making a foam comprising contacting at least one isocyanate with a foam precursor comprising at least one polyether polyol, at least one natural oil polyol, at least one blowing agent, at least one amine catalyst, dicyanamide and at least one solvent selected from the group consisting of N,N-dimethylacetoacetamide, N-monomethyl acetoacetamide, and N-methylpyrrolidone; wherein dicyanamide is dissolved in the at least one solvent; to form a foamable composition and foaming the foamable composition in a mold to prepare a foam.

5. The method of claim 4 wherein the at least one blowing agent comprises water.

6. A foam produced by the method of claim 4.

7. A method for making foam comprising contacting at least one isocyanate with a foam precursor composition comprising: at least one natural oil polyol, at least one blowing agent, at least one tertiary amine catalyst, and dicyanamide dissolved in at least one solvent comprising at least one of N,N-dimethylacetoacetamide and N-monomethyl acetoacetamide; wherein the amount dicyanamide ranges from about 0.01 pphp to less than about 2.5 pphp, and the amount of the at least one blowing agent ranges from about 1.0 pphp to about 10 pphp; to form a foamab le composition and foaming the foamable composition in a mold to prepare a foam.

8. The method of claim 7 wherein the foam precursor further comprises at least one member selected from the group consisting of silicone and anionic surfactants.

9. The method of claim 7 wherein the foam precursor further comprises at least one crosslinker.

10. The method of claim 7 wherein the at least one natural oil polyol comprises castor oil.

11. The method of claim 7 wherein the at least one natural oil polyol comprises an oil that has been modified by trans-esterification.

12. The method of claim 7 wherein the at least one natural oil polyol comprises an oil that has been modified by epoxidation.

13. The method of claim 7 wherein the foam precursor further comprises at least one polymer polyol.

14. The method of claim 7 wherein the at least one blowing agent comprises water.

15. A foam produced by the method of claim 7.

16. A method for making foam comprising contacting at least one member selected from the group consisting of hexamethylene diisocyanate, phenylene diisocyanate, toluene diisocyanate and 4,4'-diphenylmethane diisocyanate with a composition comprising at least one natural oil polyol, at least one blowing agent, at least one tertiary amine catalyst, the presence of dicyanamide in an amount less than about 1.0 pphp and at least one member selected from the group consisting of N,N-dimethylacetoacetamide, N-monomethyl acetoacetamide, and N-methylpyrrolidone; to form a foamable composition and foaming the foamable composition in a mold to prepare a foam.

17. A foam produced by the method of claim 16.

18. A foam precursor composition comprising: at least one natural oil polyol, the presence of dicyanamide in an amount less about 1.0 pphp and at least one member selected from the group consisting of N,N-dimethylacetoacetamide, and N-monomethyl acetoacetamide; wherein the foam precursor forms a moldable foam when contacted with at least one isocyanate compound.

19. The foam precursor composition of claim 18 further comprising at least one polyether polyol and at least one amine catalyst.

20. A foam precursor composition comprising at least one polyether polyol, at least one natural oil polyol, at least one amine catalyst, at least one silicone surfactant, at least one crosslinker, at least one blowing agent comprising water, at least one guanidine compound, and at least one member selected from the group consisting of N,N-dimethylacetoacetamide, and N-monomethyl acetoacetamide; wherein the amount of the least one guanidine compound ranges from about 0.01 pphp to less than about 2.5 pphp; wherein the at least one guanidine compound is dissolved in the at least one member.

21. The foam precursor composition of claim 20 wherein the at least one guanidine compound is dicyanamide and the at least one member is N,N-dimethylacetoacetamide and the foam precursor forms a moldable foam when contacted with at least one isocyanate compound.

22. The foam precursor composition of claim 20 wherein the at least one guanidine compound is dicyanamide and the at least one member is N-monomethyl acetoacetamide and the foam precursor forms a moldable foam when contacted with at least one isocyanate compound.

23. The foam precursor composition of claim 20 wherein the at least one crosslinker is diethanolamine.

24. The foam precursor composition of claim 20 wherein the at least one amine is at least one member selected from the group consisting of dimethylaminoethyl ether, triethylenediamine, Bis(N,N-dimethyl-3-aminopropyl)amine, and N,N,N-trimethyl-N'-3-aminopropyl-bis(aminoethyl)ether.

25. The foam precursor composition of claim 20 wherein the at least one amine is an acid-blocked amine.

26. A foam precursor composition comprising at least one polyether polyol, at least one natural oil polyol, at least one amine catalyst, at least one silicone surfactant, at least one crosslinker, at least one blowing agent comprising water, at least one guanidine salt selected from the group consisting of guanidine hydrochloride salt, guanidine phosphate salt and guanidine sulfate salt, and at least one member selected from the group consisting of N,N-dimethylacetoacetamide, and N-monomethyl acetoacetamide.

27. The foam precursor composition of claim 26 wherein the at least one guanidine salt is guanidine hydrochloride.

\* \* \* \* \*